(12) United States Patent
Friedl et al.

(10) Patent No.: US 8,624,455 B2
(45) Date of Patent: Jan. 7, 2014

(54) ELECTRICAL MOTOR HAVING ROTOR SUPPORT SHIELD

(75) Inventors: Daniel Friedl, Fürstenzell (DE); Oliver Memminger, Neuburg A.D. Inn (DE)

(73) Assignee: Siemens Aktiengesellschaft, München (DE)

( * ) Notice: Subject to any disclaimer, the term of this patent is extended or adjusted under 35 U.S.C. 154(b) by 105 days.

(21) Appl. No.: 13/141,573

(22) PCT Filed: Nov. 24, 2009

(86) PCT No.: PCT/EP2009/065733
§ 371 (c)(1),
(2), (4) Date: Jun. 22, 2011

(87) PCT Pub. No.: WO2010/072497
PCT Pub. Date: Jul. 1, 2010

(65) Prior Publication Data
US 2011/0254395 A1  Oct. 20, 2011

(30) Foreign Application Priority Data
Dec. 23, 2008 (DE) .......................... 10 2008 064 497

(51) Int. Cl.
*H02K 5/16* (2006.01)
*H02K 7/08* (2006.01)
*F16C 33/76* (2006.01)

(52) U.S. Cl.
USPC ............. 310/90; 310/425; 384/474; 384/477; 384/520

(58) Field of Classification Search
USPC .............................. 310/90; 384/474, 477, 520
IPC ................................................. H02K 5/16,7/08
See application file for complete search history.

(56) References Cited

U.S. PATENT DOCUMENTS

| 1,973,047 A | 9/1934 | Brown |
| 2,988,407 A | 6/1961 | Reed |

(Continued)

FOREIGN PATENT DOCUMENTS

| CH | 227 011 A | 5/1943 |
| CN | 1993872 A | 7/2007 |

(Continued)

OTHER PUBLICATIONS

Machine translation of JP2001050290, Andersson et al., Feb. 2001.*

(Continued)

*Primary Examiner* — Terrance Kenerly
(74) *Attorney, Agent, or Firm* — Henry M. Feiereisen LLC

(57) ABSTRACT

A bearing change in an electrical motor and in particular a generator having permanent magnetic excitation should be able to be carried out safely. To this end, the invention relates to an electrical motor having a shaft (2) on which a rotor is mounted and a bearing unit (5) by means of which the shaft (2) is rotatably mounted. In addition, the electrical motor has a rotor support shield (1) to which the bearing unit (5) is fastened. Furthermore, the rotor support shield (1) is sized so as to be capable of supporting the shaft (2) when the bearing unit (5) is removed and seals a grease chamber (8) of the bearing unit (5) opposite the shaft (2). With the rotor support shield, a permanent magnet-equipped rotor can in particular be prevented from coming into contact with the stator when the bearing is removed.

8 Claims, 1 Drawing Sheet

(56) References Cited

U.S. PATENT DOCUMENTS

| | | | |
|---|---|---|---|
| 3,391,291 A * | 7/1968 | O'Neil et al. | 310/90 |
| 6,854,893 B2 * | 2/2005 | Schmidt | 384/486 |
| 7,011,593 B2 * | 3/2006 | Schenk et al. | 474/199 |
| 7,448,807 B2 * | 11/2008 | Schenk et al. | 384/489 |
| 2003/0223660 A1 * | 12/2003 | Grantz et al. | 384/110 |
| 2004/0005102 A1 * | 1/2004 | Schmidt | 384/477 |
| 2006/0188190 A1 * | 8/2006 | Schmidl et al. | 384/477 |
| 2008/0012440 A1 * | 1/2008 | Zhong et al. | 310/90 |
| 2009/0300896 A1 * | 12/2009 | Ozzimo | 29/267 |

FOREIGN PATENT DOCUMENTS

| | | | |
|---|---|---|---|
| CN | 101263642 A | | 9/2008 |
| DE | 19 76 401 U | | 1/1968 |
| DE | 26 35 172 A1 | | 2/1978 |
| DE | 93 11 996 U1 | | 12/1994 |
| DE | 196 15 889 A1 | | 10/1997 |
| DE | 100 33 894 A1 | | 7/2001 |
| DE | 10 2006 040 611 A1 | | 3/2008 |
| JP | 6-311687 A | | 11/1994 |
| JP | 2001050290 | * | 2/2001 |

OTHER PUBLICATIONS

Machine translation of JP06311687, Nov. 1994, Tsunekawa et al.*

* cited by examiner

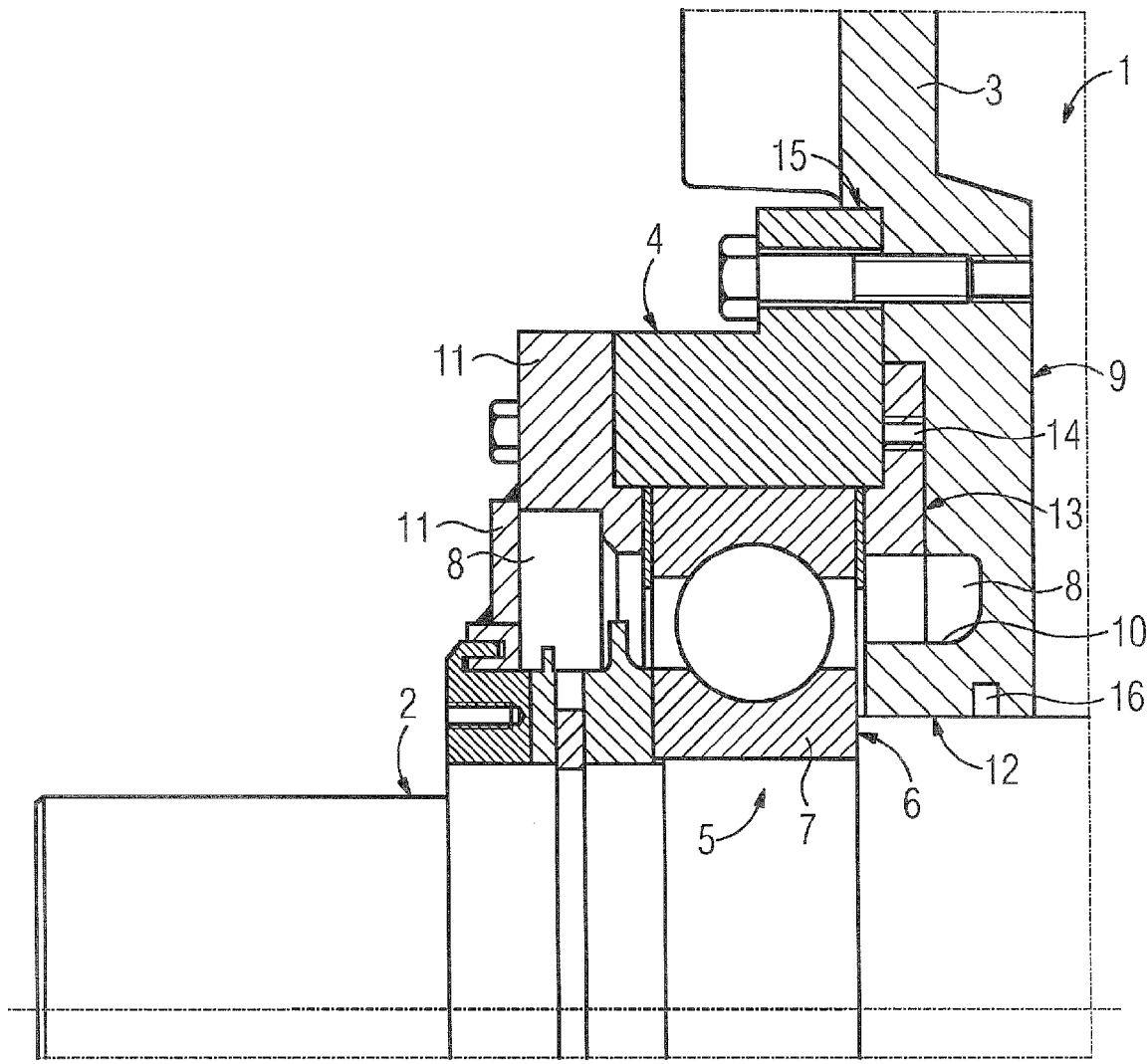

ELECTRICAL MOTOR HAVING ROTOR SUPPORT SHIELD

CROSS-REFERENCES TO RELATED APPLICATIONS

This application is the U.S. National Stage of International Application No. PCT/EP2009/065733, filed Nov. 24, 2009, which designated the United States and has been published as International Publication No. WO 2010/072497 and which claims the priority of German Patent Application, Serial No. 10 2008 064 497.8, filed Dec. 23, 2008, pursuant to 35 U.S.C. 119(a)-(d).

BACKGROUND OF THE INVENTION

The present invention relates to an electrical motor with a shaft on which a rotor is mounted and with a bearing unit by means of which the shaft is mounted rotatably. The present invention relates particularly to a permanent magnet generator as an electrical motor of this type.

Where electrical motors are concerned, it is usually necessary to exchange the bearing of the rotor at certain intervals. For this purpose, the rotor has to be supported on another component of the electrical motor or on a device intended specifically for this. In permanent magnet-excited electrical motors, the rotor adheres to the stator not only by gravity, but also by additional magnetic force, when the rotor is supported on the stator at the time of bearing exchange. Tremendous forces are then necessary in order to release the rotor from the stator again. This presents problems particularly with regard to wind power plants which possess relatively large generators.

Hitherto, and only in the case of separately excited asynchronous generators, a bearing change has been carried out with the aid of a lifting cylinder which is required for supporting and raising the rotor. The rotor is then deposited on the stator. Where permanent magnet generators are concerned, a bearing change of this type can scarcely be carried out in practice.

SUMMARY OF THE INVENTION

The object of the present invention is, therefore, to propose an electrical motor in which a bearing change can be carried out more easily. In particular, a bearing change is to be possible even in the case of permanent magnet generators.

According to the invention, this object is achieved by means of an electrical motor with a shaft on which a rotor is mounted and with a bearing unit by means of which the shaft is mounted rotatably, and also with a rotor support shield, to which the bearing unit is fastened, which is dimensioned such that it can support the shaft, with the bearing unit removed, and which seals off a grease chamber of the bearing unit with respect to the shaft.

Advantageously, the rotor support shield according to the invention fulfils not only bearing shield functionality, but also sealing functionality with regard to a grease chamber of the bearing unit. On account of this sealing functionality in which a grease chamber is sealed off with respect to the shaft, the rotor support shield bears very closely against the shaft, so that, in the event of an exchange of the bearing, the shaft can readily be supported on the rotor support shield. As a rule, the light gap is markedly smaller than the air gap between the rotor and stator, so that, even in the case of a permanent magnet generator (that is to say, a permanent magnet-excited generator), bearing exchange is readily possible, without the rotor coming into contact with the stator.

Preferably, the rotor support shield is formed as one part. It is in this case shaped such that it forms virtually a bearing shield onto which an internal grease chamber cover is formed in one piece.

The bearing unit may, in particular, be a rolling bearing. In rolling bearings of this type, exchange is necessary at regular intervals.

Furthermore, the rotor support shield may have a peripheral groove which forms part of a grease chamber for the bearing unit. There is therefore no need for additional elements which have to specially form a grease chamber.

The clearance between the rotor support shield and the shaft is advantageously smaller than 0.5 mm in the operationally ready state of the electrical motor. This low clearance is usually smaller than the air gap between the rotor and stator, particularly in the case of large motors. The rotor consequently does not come into contact with the stator even when a bearing is removed from the electrical motor.

In particular, it is advantageous if a draw-off device is arranged between the bearing outer ring and the rotor support shield, so that the rolling bearing can be drawn off from the shaft. It is thereby possible for the rolling bearing to be drawn off without great effort.

In particular, the draw-off device may be of ring-shaped design and have a plurality of threaded bores, into which can be screwed, for drawing off the rolling bearing, screws which are supported on the rotor support shield in order to generate an axial draw-off force. Only a few screws therefore have to be screwed into the draw-off device in order to draw off the rolling bearing.

Furthermore, a hub for the bearing unit may be screwed to the rotor support shield. A hub of this type, on the one hand, ensures a stable mounting and, on the other hand, allows simple bearing exchange.

Furthermore, an external grease chamber cover for sealing off the grease chamber of the bearing unit outwardly may be screwed to the hub. The external grease chamber cover, bearing unit, hub and rotor support shield thus give rise as components to a compact bearing unit with a grease chamber and with an easily exchangeable bearing.

Moreover, it is advantageous if the rotor support shield possesses a centering portion which ensures that the shaft with bearing unit is centered in the rotor support shield when the hub is screwed to the latter. The centering portion thus ensures that, after the bearing change, the rotor lifts off automatically from the rotor support shield during assembly and is brought into the desired centered position.

As already indicated, it is especially advantageous if the electrical motor outlined is designed as a permanent magnet generator, since what should be avoided precisely in the case of such a generator is that the rotor comes into contact with the stator during the bearing exchange.

BRIEF DESCRIPTION OF THE DRAWING

The present invention, then, is explained in more detail by means of the accompanying drawing which shows a cross section through a bearing portion of an electrical motor.

The exemplary embodiments outlined in more detail below constitute preferred embodiments of the present invention.

DETAILED DESCRIPTION OF PREFERRED EMBODIMENTS

The FIGURE shows a rotor support shield 1 which is typically arranged on the end face of an electrical motor. It may therefore be considered as being similar to a bearing shield as part of the overall housing of the electrical motor. The FIGURE illustrates only that enlarged portion of the rotor support shield 1 which is located in the center of the electrical motor, that is to say in the vicinity of the shaft 2 of the rotor, not illustrated in any more detail. The rotor support shield 1 possesses a bearing shield portion 3 to which a hub 4 is screwed. A rolling bearing 5 is located between the hub 4 and a corresponding portion of the shaft 2. The inner ring 6 of the rolling bearing 5 is pressed directly onto the shaft 2. The outer ring 7 of the rolling bearing 5 is supported by the hub 4. The shaft 2 is consequently mounted via a hub 4 in the conventional way.

Furthermore, the bearing is lubricated by the grease of a grease chamber 8. The grease chamber 8 extends in the axial direction on both sides of the rolling bearing 5. Inside the electrical motor, the grease chamber 8 is sealed off, between the shaft and rotor support shield, by an internal cover portion 9 with seal (felt ring) which is connected in one part to the bearing shield portion 3 and with the latter forms the rotor support shield 1. So that a desired volume of the grease chamber 8 can be ensured, the internal cover portion 9 possesses a peripheral groove 10 into which grease can be pressed. The internal cover portion 9 extends virtually as far as a corresponding portion of the shaft 2. Between the two components a gap 12 remains, which cannot be seen in the FIGURE and which is usually smaller than 0.5 mm and amounts, for example, to 0.3 mm. The grease chamber 8 is sealed off with respect to the shaft 2 by means of the internal cover portion 9 as a result of this small gap 12 and the seal 16. Grease from the grease chamber 8 therefore cannot penetrate into the inner space of the electrical motor. The grease chamber 8 is closed outwardly be means of an external cover 11. This external cover 11 of the grease chamber 8 is screwed axially onto the hub 4.

A draw-off device 13 is provided between the internal cover portion 9, on the one hand, and the hub 4 and bearing outer ring 7, on the other hand. In the assembled state, the draw-off device 13, which is of ring-shaped design, has virtually no effect. The draw-off device 13 is required only for drawing off the rolling bearing 5. For this purpose, the draw-off device 13 possesses, for example distributed on the circumference, threaded bores 14 into which screws (not illustrated) are screwed for drawing off and are then supported on the internal cover portion 9. The draw-off of the rolling bearing 5 is, of course, possible only when the hub 4, including the external cover 11, has been unscrewed from the rotor support shield 1.

The function of the rotor support shield according to the invention is explained in more detail below. As already indicated, in the exchange of the rolling bearing 5, first the hub 4, including the external cover 11, is unscrewed from the electrical motor (for example, a permanent magnet generator). The rolling bearing 5 consequently loses radial support. However, since the gap 12 is very small, with the hub 4 removed the shaft is supported radially by the rotor support shield 1, especially the internal cover portion 9. Since there is only a clearance of 0.3 mm between the shaft 2 and internal cover portion 9, there is no need to support the shaft 2 by means of an additional appliance. Moreover, a rotor fitted with permanent magnets cannot come to bear against the stator and remain adhering there with tremendously high forces.

A rotor support shield 1 according to the invention which is of this type can be used especially advantageously in wind power plants. To be precise, a bearing change can thereby be carried out in the gondola of a wind power plant having a permanent magnet motor, without the rotor being capable of coming to bear against the stator. The rotor could otherwise no longer be released due to the high forces in the gondola.

It should be possible for the rolling bearing 5 to be drawn off from outside, without the rotor having to be removed completely from the stator. Since the rolling bearing 5 is pressed onto the shaft 2, correspondingly high forces are necessary in order to draw it off. In the present example, therefore, the ring-shaped draw-off device 13 is integrated in the internal cover portion 9. With the hub 4 removed, the threaded bores 14 of the draw-off device 13 are accessible. As already indicated, the axial forces for drawing off are generated by screws which are supported on the internal cover portion 9. In this case, an inner radial portion of the draw-off device 13 presses against the bearing outer ring 7 of the rolling bearing 5. The rolling bearing 5 can thus be pressed off from the shaft 2.

After a new bearing has been mounted on the shaft 2, the hub 4, including the external cover 11, is screwed to the rotor support shield 1 again. However, since the shaft 2 is supported on the rotor support shield 1, said shaft has to be raised in the radial direction in order to reach its operationally ready position. For this purpose, a shaped slope 15 on the rotor support shield 1 and a corresponding fit on the hub 4 serve as a centering portion. The shaped slope 15 provides in the rotor support shield 1 a conical depression which merges into a cylindrical fit. When the hub 4 is fitted with its fit into this depression, centering of the shaft 2 is thereby achieved automatically. In a special case, by the hub 4 being screwed on, raising of the shaft by the amount of 0.3 mm and consequently self-centering of the shaft take place. Alternatively, of course, a fit with a shaped slope on the hub and a corresponding fit on the rotor support shield may also be provided for the self-centering of the shaft. If appropriate, a lifting cylinder may additionally be used in order to raise the rotor.

The rotor support shield 1 according to the invention, by means of which the rotor can be supported during a bearing change, brings numerous advantages. On the one hand, costs and space for additional appliances, such as an on-board crane in the gondola of a wind power plant, can be saved. Furthermore, the bearing shield or rotor support shield (for example, 250 kg) does not have to be removed from the generator and set down on the thin gondola wall, which would cause safety problems. Moreover, a bearing change in the most confined possible space is possible as a result of the rotor support shield according to the invention.

The invention claimed is:

1. An electrical motor, comprising:
   a shaft;
   a rotor mounted on the shaft;
   a bearing unit for rotatably supporting the shaft;
   a rotor support shield dimensioned to extend to the shaft, with a gap being defined between confronting surfaces of the rotor support shield and the shaft and being sufficiently small to support the shaft, when the bearing unit is removed, said rotor support shield shaped to bound a grease chamber and to seal off the grease chamber with respect to the shaft, said grease chamber adapted for lubrication of the bearing unit and disposed axially outwards of the bearing unit;
   a hub connected to the rotor support shield, with the bearing unit being arranged axially inwards at a distance to the rotor support shield between the hub and the shaft;
   an external cover connected to the hub to seal the grease chamber against the outside; and
   a draw-off device arranged between the bearing outer ring of the bearing unit and the rotor support shield to allow the bearing unit to be withdrawn from the shaft.

2. The electrical motor of claim 1, wherein the bearing unit is a roller bearing.

3. The electrical motor of claim 1, wherein the rotor support shield is a single-piece part.

4. The electrical motor of claim 1, wherein the rotor support shield has a peripheral groove which forms part of the grease chamber of the bearing unit.

5. The electrical motor of claim 1, wherein the gap is smaller than 0.5 mm, when the electrical motor is ready for operation.

6. The electrical motor of claim 1, wherein the draw-off device has a ring-shaped configuration and includes a plurality of threaded bores for accepting screws when withdrawing the bearing unit, said screws being supported on the rotor support shield to generate an axial draw-off force.

7. The electrical motor of claim 1, wherein the rotor support shield has a centering portion to realize a centered position of the shaft with the bearing unit in the rotor support shield, when the hub is screwed to the rotor support shield.

8. The electrical motor of claim 1, constructed in the form of a permanent magnet generator.

* * * * *